Patented May 2, 1944

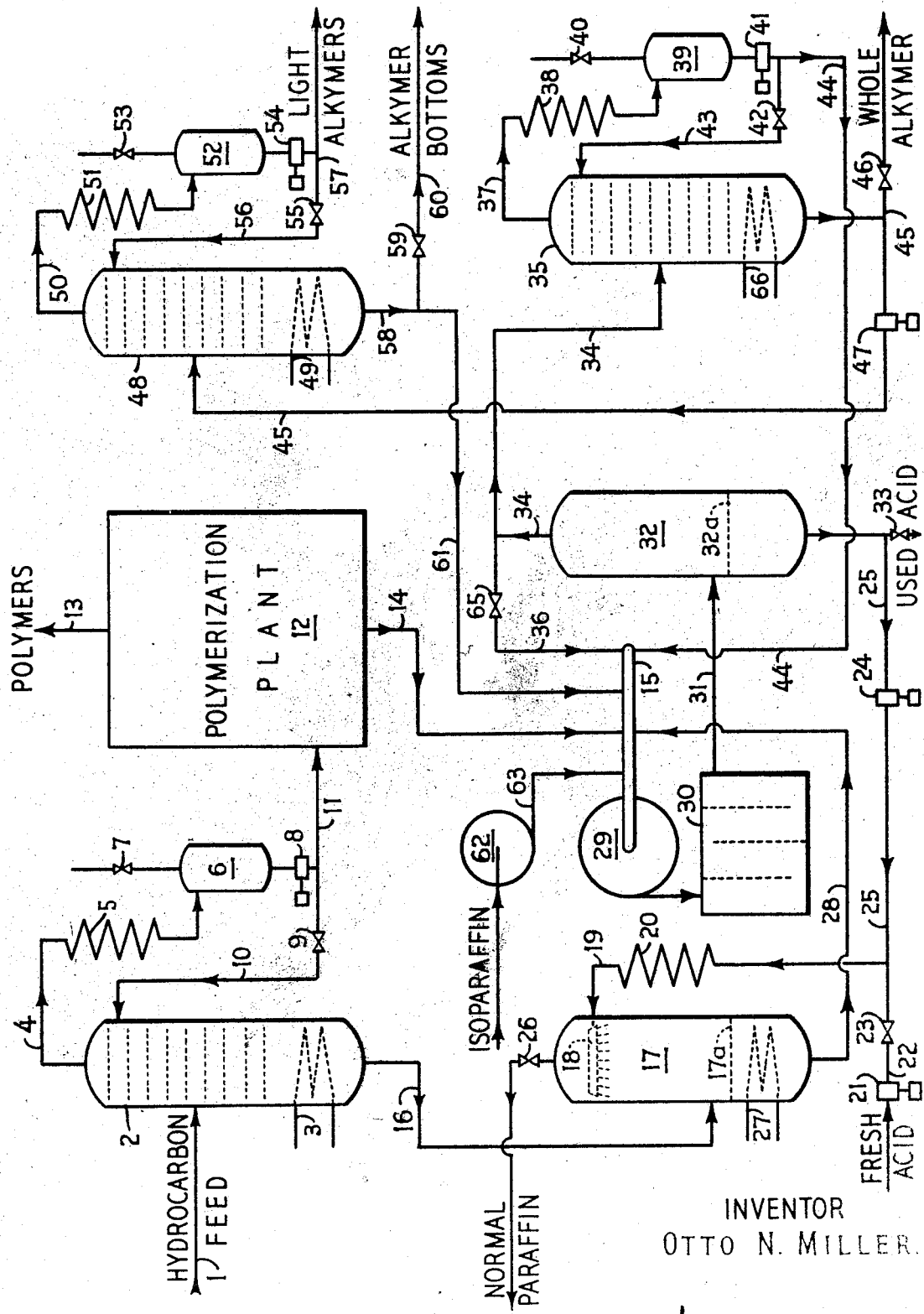

2,348,017

UNITED STATES PATENT OFFICE 2,348,017

REACTION OF HYDROCARBONS

Otto N. Miller, El Segundo, Calif., assignor to Standard Oil Company of California, San Francisco, Calif., a corporation of Delaware Application October 13, 1939, Serial No. 299,289

7 Claims. (Cl. 260—683.4)

This invention relates to an improved process for the production of motor fuels of high antiknock value from hydrocarbons containing more than two and less than six carbon atoms per molecule and, more particularly, to a process wherein relatively light hydrocarbon mixtures containing olefins and isoparaffins are subjected to polymerization and alkylation reactions in a manner to produce high yields of liquid motor fuel of high quality.

The catalytic polymerization of normally gaseous olefin containing from two to five carbon atoms per molecule such, for instance, as result from the cracking of petroleum oils or the dehydrogenation of fractions from natural gas, by means of catalysts comprising or derived from sulfuric or phosphoric acids has resulted in materially augmenting the available supply of motor fuel, and particularly fuel having higher than average nondetonating value. When the polymers so produced are saturated by hydrogenation, they provide excellent raw material for the preparation of superior aviation motor fuels.

It has also been disclosed that the isoparaffinic hydrocarbons, such as isobutane and isopentane, may be caused to react with the normally gaseous olefins, such as propylene and the butenes, by means of liquid acid catalysts, such as concentrated sulfuric acid. In its simplest expression this reaction results in the addition of a single olefin molecule to a molecule of the isoparaffin with the production of a new isoparaffin molecule containing a number of carbon atoms equal to the sum of those in the original olefin and isoparaffin. This reaction is herein referred to as one of "alkylation" and the products thereof as "alkymers." The alkymers produced from the isoparaffins containing less than six carbon atoms per molecule and the normally gaseous olefins have a high antiknock value and are therefore suited for use in the preparation of aviation motor fuels.

Both the polymerization of gaseous olefins and the alkylation of isoparaffin by olefins are thus particularly applicable to the production of motor fuels of high octane number and have been found especially useful in the production of such fuels from the light hydrocarbon mixtures resulting from the cracking of petroleum or the partial dehydrogenation of fractions from natural gas. Fuels of the highest octane number are at present produced for use in aviation motors and are thus limited by the high volatility requirements of such service to an end point such that little or no material boiling above the nonanes may be included. The so-called "C4 cut" from the cracking reaction is thus at present the most readily available and generally satisfactory raw material from which to produce such superior fuels by either alkylation or polymerization. Neither such reaction will, however, alone convert more than about half of a C4 cut of usual composition into liquid motor fuel, and a more efficient utilization of the available raw material than is provided by either is thus much to be desired.

In one method which has been proposed for effecting the foregoing alkylation reaction, the isoparaffin and olefin reactants are intimately contacted in the presence of a liquid sulfuric acid catalyst and the alkymers formed thereby are separated from the catalyst and from unreacted raw material by any appropriate means.

In another specific method for alkylating isoparaffins with olefins advantage is taken of the discovery that the alkylation of an isoparaffin by an olefin, in the presence of a strong acid of the nature of sulfuric acid, is not a single reaction but is in fact the sum of two entirely distinct reactions which may therefore be separated and each effected under the conditions best suited to it with considerable improvement in operation and in the product obtained.

The two separate reactions which result in the alkylation of an isoparaffin by an olefin in the presence of a strong acid of the sulfuric acid type are: first, the alkylation of the acid by the olefin to form what is for convenience referred to herein as an "alkylated acid" solution containing free acid, some of the alkyl acid ester of the acid, some polymers and apparently some as yet unidentified compound between the acid and the olefin or a polymer or other reaction product thereof, and second, the reaction of the alkylated acid solution thus produced with the isoparaffin to form an alkyl isoparaffin or alkymer and, with the isoparaffin in substantial excess, to release the acid approximately as it was before the alkylation.

It has been found that the conditions best suited to the acid alkylation stage are not the same as those for the hydrocarbon alkylation stage and that the maximum benefits that may be derived from conducting the alkylation reaction in two separate stages are largely dependent upon the specific manner in which and the specific conditions under which each stage is effected and the arrangement of the stages with respect to other necessary operations in a complete process for producing alkymers boiling in the range of motor fuels from readily available raw materials.

It has also been found that the alkymers produced from a normal olefin and an isoparaffin are of appreciable higher octane value then those derived from the corresponding iso-olefin and isoparaffin, and further, that a higher ultimate yield of high antiknock motor fuel of superior quality can be produced from a given quantity of raw material containing iso-olefin, normal olefin and isoparaffin by first selectively polymerizing the iso-olefin and/or copolymerizing it with a portion of the normal olefin and then causing the remaining normal olefin to alkylate the isoparaffin than can be produced from the same quantity of the same raw material by any other sequence of steps. It has, however, at the same time been found that when a mixture containing iso-olefin, normal olefin and isoparaffin, such as the butane-butene fraction produced during the cracking of a petroleum oil, is subjected to the usual polymerization by the widely used polymerization catalysts of the phosphoric acid type, a substantial portion of the isoparaffin is lost through conversion to normal paraffin by a reaction which amounts, in effect at least, to isomerization and the quantity of isoparaffin thus remaining for alkylation is materially reduced.

It is an object of the present invention to provide a process comprising polymerization and alkylation steps whereby a maximum yield of motor fuel of maximum antiknock value may be produced from a given quantity of raw material containing olefins and isoparaffins.

It is another object of the present invention to provide a process comprising the separation of isobutane and isobutene from admixture with normal butane and normal butene, the catalytic polymerization of said isobutene and the subsequent alkylation of said isobutane with said normal butene whereby a maximum yield of fuel of maximum antiknock value is produced.

It is a more specific object of the present invention to provide a process comprising the selective polymerization of iso-olefin from admixture with the corresponding isoparaffin under conditions controlled to conserve said isoparaffin for subsequent alkylation with normal olefin.

It is another specific object of the present invention to provide a process for converting hydrocarbon mixtures containing isoparaffin, iso-olefin, normal paraffin and normal olefin into motor fuel of high antiknock value and in high yield which comprises separating the isoparaffin and iso-olefin from the normal paraffin and normal olefin, polymerizing the iso-olefin in the presence of the isoparaffin under conditions which do not result in the substantial isomerization of the isoparaffin and then alkylating said isoparaffin with said normal olefin.

It is a more specific object of the invention to provide a process wherein a butane-butene hydrocarbon fraction is fractionally distilled to separate isobutane, isobutene and 1-butene from normal butane and 2-butene, the separated isobutane-isobutene-1-butene cut is subjected to polymerization under mild conditions whereby the isobutene and part or all of the 1-butene is polymerized and removed, the normal butane-2-butene cut is caused to alkylate a strong acid solution and the thus alkylated acid solution is used to alkylate the isobutane.

The process of the present invention will now be described with reference to the C₄ or butane-butene fraction of the hydrocarbons resulting from the liquid phase cracking of a petroleum oil, although it is to be understood that the invention is not limited thereto but may be applied with good results to other hydrocarbon mixtures containing isoparaffins of less than six carbon atoms per molecule, corresponding normal paraffins and corresponding iso- and normal olefins or olefins containing a smaller number of carbon atoms per molecule. The analysis of a typical butane-butene cut is as follows:

*Hydrocarbon analysis*

|  | Per cent |
|---|---|
| C₃ and lighter | 3.1 |
| Isobutene | 17.5 |
| Normal butenes | 26.5 |
| Isobutane | 18.0 |
| Normal butane | 34.6 |
| C₅ and heavier | 0.3 |
|  | 100.0 |

In a preferred embodiment of the present invention such a fraction as produced, or usually after appropriate purification for the removal of nitrogen and/or sulfur-containing compounds, is subjected to fractional distillation whereby an overhead fraction, comprising isobutane, isobutene, 1-butene and any C₃ hydrocarbons present and a bottoms fraction comprising normal butane, 2-butene and any C₅ hydrocarbons present are produced.

This separation may be better understood by reference to the following table of approximate boiling points:

*Boiling points of hydrocarbons*

|  | °C | °F |
|---|---|---|
| C₃ and lighter | Below −44.0 | −47.2 |
| Isobutane | −10.2 | 13.6 |
| Isobutene | −6.0 | 21.2 |
| 1-butene | −5.0 | 23.0 |
| Normal butane | 0.6 | 33.0 |
| 2-butene (cis) | 1.0 | 33.8 |
| 2-butene (trans) | 2.5 | 36.5 |
| C₅ and heavier | Above 9.0 | 48.2 |

The overhead fraction containing isobutane, isobutene and 1-butene is passed through a polymerization plant wherein it is subjected to controlled, mild, polymerizing conditions in the presence of an appropriate polymerization catalyst for the selective polymerization of the isobutene and/or its copolymerization with 1-butene. The residual C₄ cut after this polymerization operation will thus consist substantially of isobutane or isobutane containing a minor proportion of 1-butene. The bottoms fraction, containing the normal butane and 2-butene is contacted with a solution of strong acid of the sulfuric acid type whereby the butene is absorbed, producing an alkylated acid solution and the normal butane is left as a separate phase and may thus be easily eliminated from the system.

The alkylated acid solution so produced is then intimately contacted with the residual C₄ cut from the polymerization step in a separate hydrocarbon alkylation zone under conditions such that isobutane is in large excess over the organic components of the alkylated acid. The alkylated acid solution and such 1-butene as may remain in the C₄ cut effect the alkylation of the isobutane and the acid is thereby liberated. The acid and hydrocarbon layers are separated, the hydrocarbon layer is stabilized for the removal of excess isobutane from the alkymer product, the isobutane is returned to the hydrocarbon alkylation stage, the liberated acid is returned to the acid alkylation stage and the alkymer product is redistilled to give a fuel of desired boiling range or is otherwise treated as may be desired.

The polymerization reaction in the polymerization plant may be effected by means of any one of several known polymerization catalysts as, for instance, sulfuric acid or phosphoric acid. When it is desired to selectively polymerize a portion of the isobutene and copolymerize a portion of it with 1-butene, such result may be obtained by means of a phosphoric acid catalyst at temperatures between about 50° F. and 350° F. Either the so-called "solid phosphoric acid" catalyst prepared by calcining a mixture of phosphoric acid absorbed in diatomaceous earth or the "film type" catalyst consisting of a thin film of phosphoric acid adsorbed on the surface of an inert, non-porous solid support, such as glassy quartz, is suitable for this purpose. When it is desired to polymerize only the isobutene to di-isobutene, either of the above types of phosphoric acid catalyst may be employed, holding the reaction temperature between about 50° F. and 150° F., or a liquid sulfuric acid catalyst containing about 60% to 70% $H_2SO_4$ may be used at a temperature between about 90° F. and 130° F.

The strong acid alkylation catalyst employed in the alkylation stages of the process may be any one of several of the sulfuric acid type such as concentrated sulfuric acid, containing above about 90% $H_2SO_4$, chlorosulfonic acid, mixed sulfuric and phosphoric acids or mixed sulfuric and chlorosulfonic acids. For convenience in further explaining the process of the present invention concentrated sulfuric acid will be employed as the preferred example without, however, signifying that the invention is limited thereto.

The alkylation of sulfuric acid by 2-butene takes place readily with acid of any strength above about 50% $H_2SO_4$ at ordinary atmospheric temperatures and the butene in either gaseous or liquid phase. The most important precaution to be observed in effecting the acid alkylation reaction is to prevent the temperature of reaction from increasing, due to the heat liberated in the reaction, to a point at which undesirable side reactions take place to a considerable extent. It will usually be found desirable to maintain the temperature of reaction below about 100° F.

The alkylation of isobutane by the alkylated sulfuric acid, on the contrary, requires that all of several reaction conditions be fulfilled and closely maintained. For instance, it is practically necessary that the isobutane be in liquid phase, that the contact between isobutane and the alkylated acid solution be extremely good, that the concentration of butyl acid sulphate and other alkyl components in the alkylated acid be relatively low, usually of the order of about 1%, that the concentration of free sulfuric acid be above about 86% by weight, that the ratio of isobutane to total acid alkylation products be high, usually well above 10 to 1 and that the temperature be closely controlled and maintained below about 150° F., in order to obtain a satisfactory rate of reaction and at the same time to avoid undesirable side reactions.

According to the process of the present invention, the acid alkylation reaction is effected in any convenient manner, such as by dispersing the acid in a body of the liquid hydrocarbon mixture, containing the 2-butene and normal butane, or by dispersing said mixture in a body of the acid or by bubbling said mixture as a gas through the liquid acid. Ordinarily, it will be found most desirable for simplicity of operation and economy of equipment to effect the acid alkylation reaction according to the continuous countercurrent principle wherein the liquid hydrocarbon mixture is caused to pass upwardly through a vessel of appropriate dimensions, such as a 10 x 30 foot unpacked cylindrical drum, while the liquid acid is dispersed from a suitable distributor placed near the top of said vessel, falls by gravity through the ascending hydrocarbon phase and is collected and drawn off from the bottom of the vessel. In such a method of operation, the relation between the quantities of hydrocarbon and acid charged per unit of time may be varied so as to remove substantially all of the olefin from the hydrocarbon mixture during a single passage of the acid through the column under the temperature conditions most suitable to the reaction and, at the same time, to build up the desired concentration of alkylation products in the alkylated acid.

The process of this invention may be better understood by reference to the figure of the attached drawing. According to my preferred method, a hydrocarbon mixture containing olefin and both normal and isoparaffins, such as the above butane-butene cut, may be passed through line 1 to butane still 2 equipped with heating element 3, wherein it is fractionated to produce an overhead distillate containing isobutane, isobutene and 1-butene, and a bottom fraction containing normal butane and 2-butene. The overhead fraction is passed through line 4 and condenser 5 to receiving drum 6, from which uncondensed material may be vented through valve 7. Liquid condensate removed from drum 6 by pump 8 may be returned to still 2 by means of valve 9 and line 10, or may be sent forward through line 11 to the polymerization plant 12 which may be of any well-known design and is hence shown only in diagram. After removal of the isobutene and a portion or all of the 1-butene in the polymerization plant, the remainder of the overhead $C_4$ cut, containing a large proportion of isobutane, is passed through line 14 to manifold 15 of the hydrocarbon alkylation stage presently to be described.

The bottoms fraction from the butane still 2, containing 2-butene and normal butane, may be removed through line 16 and passed to the acid alkylation zone 17 to be contacted therein with acid introduced from an appropriate distributor-header 18, whereby the 2-butene is absorbed by the acid forming alkylated acid solution 17a and is thus separated from the normal butane, which may then be removed through valve 26. Since the heat liberated in the acid alkylation reaction is, as previously indicated, sometimes quite considerable, it will usually be found desirable to equip the acid alkylation zone 17 with a cooling coil 27, which may be conveniently immersed in the alkylated acid layer 17a, as indicated. Also in the interest of temperature control in the acid alkylation reaction, it may be desirable to equip the acid feed line 19, leading to the header 18, with a temperature regulator 20 by means of which to heat or cool the incoming acid, as may be desired. Fresh acid usually of 95% or higher $H_2SO_4$ concentration is fed to line 19 by pump 21 through line 22 and valve 23, while recycled acid may be supplied by pump 24 through line 25, as later explained.

The alkylated acid collected at 17a is led from the acid alkylation zone through line 28 and delivered to manifold 15 of the hydrocarbon alkylation zone wherein it is mixed with the residual C₄ overhead fraction entering from the polymerization plant through line 14, as previously mentioned. Additional isobutane from an external source may be introduced into manifold 15 through line 63 by means of pump 62 in order to maintain the necessary high ratio of isobutane to acid alkylation products. The mixture of hydrocarbon and acid produced in manifold 15 is led directly into contactor 29, which may be of any appropriate construction to give intimate contact between an aqueous and an oil phase. The reaction mixture from contactor 29 may be passed through a further contacting zone 30, in order to provide ample time for completion of the hydrocarbon alkylation reaction, and thence through line 31 to separator 32 wherein the acid liberated during the alkylation reaction is separated from the alkymer product and excess isobutane and is collected as indicated at 32a, while the hydrocarbon layer is led through line 34 to the alkymer stabilizer 35. Under certain conditions, it may be desirable to return a portion of the alkymer product and excess isobutane to manifold 15 of the hydrocarbon alkylation zone through valve 65 and line 36. The liberated acid collected at 32a may be discharged from the system through valve 33 or returned by pump 24 through line 25, cooler 20 and line 19 to the acid alkylation zone 17 for further participation in the cycle.

In alkymer stabilizer 35, which is equipped with heating element 66, the alkymer product is separated from excess isobutane which passes overhead through line 37 and condenser 38 to receiving drum 39, while the alkymer product passes through line 45 and may be removed to storage through valve 46 or sent by means of pump 47 to alkymer still 48. A portion of the liquid isobutane collected in drum 39 may be returned by pump 41 through valve 42 and line 43 to provide reflux liquid in stabilizer 35, while the remainder is returned through line 44 to manifold 15 of the hydrocarbon alkylation zone, as above mentioned.

Alkymer still 48, which is equipped with heating element 49, may be employed to produce an alkymer overhead fraction of any desired end point which passes through line 50 and condenser 51 to receiving drum 52 and an alkymer bottoms fraction which may be removed through line 58 and discharged from the system through valve 59 and line 60, or preferably returned through line 61 to manifold 15 of the hydrocarbon alkylation zone. Light alkymer distillate collected in drum 52 may be returned by pump 54 through valve 55 and line 56 to the alkymer still 48 or discharged from the system through line 57. Any gases having accumulated in receiving drum 52 may be released through the line controlled by valve 53.

One particular advantage of the process of the present invention that may be emphasized in summary is the separation of 2-butene from isobutane prior to passing the latter admixed with isobutene and 1-butene to the polymerization stage. By thus substantially reducing the concentration of normal olefin in the mixture fed to the polymerization plant and by further controlling the conditions therein to give only selective or copolymerization, it has been found possible to reduce the loss of isobutane from as high as 50% to 60% to well below 20% and thus to effect a very worthwhile saving of this valuable raw material.

Another advantage of the operation outlined results from feeding to the acid alkylation stage a mixture from which the isoparaffin has been eliminated and thus the possibility of forming undesirable alkymers under the unfavorable conditions prevailing in the acid alkylation zone is positively avoided. Still another advantage results from the ready elimination of normal paraffin which is made possible by feeding to the acid alkylation stage a mixture of substantially only normal paraffin and normal olefin of corresponding or lower molecular weight. By this means the separation of normal paraffin from olefin having a boiling point so close to that of the normal paraffin as to preclude practical separation by distillation is effected in a simple and expeditious manner.

Although the best method of applying the process of this invention has been explained and illustrated by reference to a specific butane-butene cut, the process of the invention is, nevertheless, useful for manufacturing high antiknock motor fuel hydrocarbons from any mixture of relatively light hydrocarbons containing isoparaffin having less than six carbon atoms per molecule, a corresponding normal paraffin, and normal and iso-olefins of corresponding or lower molecular weight wherein a separation by fractional distillation may be readily effected between the isoparaffin and iso-olefin on the one hand, and, on the other hand, the normal paraffin and any normal olefin having a boiling point so close to that of the normal paraffin that it is practically impossible to separate them by fractionation, because with such a mixture of hydrocarbons the advantages of this invention resulting from subjecting to polymerization a mixture containing isoparaffin, iso-olefin, and a minimum of normal olefin, from confining the hydrocarbon alkylation to the second stage and from the complete separation of the normal paraffin from any olefin having a boiling point too close to that of the normal paraffin for ready separation by distillation can be obtained. Furthermore, the process of this invention in a broader sense embraces the manufacture of high antiknock motor fuel hydrocarbons from any relatively light hydrocarbon fraction containing isoparaffin, iso-olefin and normal olefin by separating a portion of said normal olefin from said fraction so that the concentration of normal olefin in said fraction is reduced to minimize loss of isoparaffin when the remainder of said fraction is subjected to polymerization controlled to form polymers and minimize loss of isoparaffin and by alkylating the isoparaffin with the separated normal olefin in a hydrocarbon alkylation zone. Likewise, while sulfuric acid has been mentioned in the foregoing description as the preferred alkylation catalyst and sulfuric or phosphoric acid as the preferred polymerization catalyst, other strong acid alkylation catalysts of the sulfuric acid type, of which several have been named, may be employed in the alkylation stages and other selective polymerization catalysts may be used in the polymerization reaction.

Having now fully described and explained an improved process for effecting the reaction of hydrocarbon mixtures comprising isoparaffins and olefins for the production of valuable hydrocarbons of high antiknock value, I claim:

1. In a process of producing a high yield of high antiknock motor fuel hydrocarbons from a mixture of relatively light hydrocarbons containing isobutane, isobutene, 1-butene, 2-butene and normal butane, the steps which comprise separating said mixture by fractional distillation into a first fraction containing isobutane, isobutene and 1-butene and a second fraction containing 2-butene and normal butane, passing said first fraction to a polymerizing zone wherein said fraction is subjected to polymerizing conditions controlled to produce polymers and to minimize loss of isobutane, separating said polymers from the unpolymerized portion of said fraction, absorbing 2-butene from said second fraction in a sulfuric acid alkylation catalyst containing above about 86% by weight $H_2SO_4$ thus forming an alkylated sulfuric acid solution containing butyl acid sulphate and separating substantially pure normal butane, and alkylating a portion of said isobutane from the said unpolymerized portion of said first fraction with said alkylated sulfuric acid solution.

2. Process of producing a high yield of high antiknock motor fuel hydrocarbons from a mixture of relatively light hydrocarbons containing isobutane, isobutene, 1-butene, 2-butene and normal butane, which comprises separating said mixture by fractional distillation into a first fraction containing isobutane, isobutene and 1-butene and a second fraction containing 2-butene and normal butane, passing said first fraction to a polymerizing zone wherein said fraction is subjected to polymerizing conditions controlled to produce polymers by polymerizing isobutene and to minimize loss of isobutane, separating said polymers from the unpolymerized portion of said fraction, absorbing 2-butene from said second fraction in an acid alkylation catalyst of the sulfuric acid type thus alkylating said acid and forming an alkylated acid solution and a separate hydrocarbon phase containing normal butane, and alkylating a portion of said isobutane from the said unpolymerized portion of said first fraction with said alkylated acid solution.

3. Process of producing a high yield of high antiknock motor fuel hydrocarbons from a mixture of relatively light hydrocarbons containing isobutane, isobutene, 1-butene, 2-butene and normal butane, which comprises separating said mixture by fractional distillation into a first fraction containing isobutane, isobutene and 1-butene and a second fraction containing 2-butene and normal butane, passing said first fraction to a polymerizing zone wherein said fraction is subjected to polymerizing conditions controlled to produce polymers by polymerizing isobutene and copolymerizing isobutene and 1-butene and to minimize loss of isobutane, separating said polymers from the unpolymerized portion of said fraction, absorbing 2-butene from said second fraction in an acid alkylation catalyst of the sulfuric acid type thus alkylating said acid and forming an alkylated acid solution and a separate hydrocarbon phase containing normal butane, and alkylating at least a portion of said isobutane from the said unpolymerized portion of said first fraction with said alkylated acid solution in the absence of normal butane.

4. Process of producing a high yield of high antiknock motor fuel hydrocarbons from a mixture of relatively light hydrocarbons containing isobutane, isobutene, 1-butene, 2-butene and normal butane, which comprises separating said mixture by fractional distillation into a first fraction containing isobutane, isobutene and 1-butene and a second fraction containing 2-butene and normal butane, passing said first fraction to a polymerizing zone wherein said first fraction is subjected to polymerizing conditions controlled to produce polymers and to minimize loss of isobutane, separating said polymers from the unpolymerized portion of said fraction, absorbing 2-butene from said second fraction in an acid alkylation catalyst of the sulfuric acid type thus alkylating said acid and forming an alkylated acid solution and a separate hydrocarbon phase containing normal butane and alkylating at least a portion of said isobutane from the said unpolymerized portion of said first fraction with said alkylated acid solution.

5. Process of manufacturing high antiknock motor fuel hydrocarbons from a mixture of relatively light hydrocarbons containing normal butane, isobutane, isobutene, 1-butene and 2-butene, which comprises separating normal butane and 2-butene from said mixture by fractional distillation, passing the remaining mixture containing isobutene, 1-butene and isobutane to a polymerizing zone wherein said remaining mixture is subjected to polymerizing conditions controlled to produce polymers and to minimize loss of isobutane, separating said polymers from the unpolymerized portion of said remaining mixture, absorbing 2-butene from normal butane in an excess of alkylation catalyst capable of absorbing said 2-butene and thereby forming an alkylated catalyst solution containing an excess of catalyst and separating therefrom normal butane, passing said unpolymerized portion of said remaining mixture and said alkylated catalyst solution containing an excess catalyst to an alkylation zone wherein isobutane is alkylated.

6. In a process of producing a high yield of high antiknock motor fuel hydrocarbons from a butane-butene cut containing isobutane, isobutene, normal butane, 1-butene and 2-butene, the steps which comprise fractionally distilling said cut to produce an overhead fraction containing isobutane, isobutene and 1-butene and a bottoms fraction containing 2-butene and normal butane, contacting said bottoms fraction with sulfuric acid containing above about 86% by weight $H_2SO_4$ in an acid alkylation zone forming an alkylated acid solution containing butyl acid sulphate by reaction of said 2-butene with said sulfuric acid and thus separating the normal butene from said normal butane, passing said alkylated acid solution to a hydrocarbon alkylation zone separate from said acid alkylation zone, passing said overhead fraction containing isobutane, isobutene and 1-butene to a polymerization zone wherein conditions are controlled to produce polymers and minimize loss of isobutane, separating said polymers from the unpolymerized portion of said overhead fraction and passing said unpolymerized portion containing isobutane to said hydrocarbon alkylation zone, intimately contacting said isobutane with said alkylated acid solution in said hydrocarbon alkylation zone, passing the resulting reaction mixture to a separating zone wherein sulfuric acid is separated from hydrocarbons, returning a portion of said separated hydrocarbons to said alkylation zone, returning a portion of said separated sulfuric acid to said acid alkylation zone, passing the remaining portion of said hydrocarbons separated from said sulfuric acid in said separating zone to a stabilizing zone wherein isobutane is distilled from alkymer product, condensing said isobutane and returning a portion thereof to said hydrocarbon alkylation zone, passing said alkymer product from said stabilizing zone to an alkymer product still and therein distilling from said alkymer product a desired motor fuel fraction.

7. In a process of producing a high yield of high antiknock motor fuel hydrocarbons from a butane-butene cut containing isobutane, isobutene, normal butane, 1-butene and 2-butene, the steps which comprise fractionally distilling said cut to produce an overhead fraction containing isobutane, isobutene and 1-butene and a bottoms fraction containing 2-butene and normal butane, contacting said bottoms fraction with sulfuric acid containing above about 86% by weight $H_2SO_4$ in an acid alkylation zone forming an alkylated acid solution containing butyl acid sulphate by reaction of said 2-butene with said sulfuric acid and thus separating the normal butene from said normal butane, passing said alkylated acid solution to a hydrocarbon alkylation zone separate from said acid alkylation zone, passing said overhead fraction containing isobutane, isobutene and 1-butene to a polymerization zone wherein conditions are controlled to produce polymers and minimize loss of isobutane, separating said polymers from the unpolymerized portion of said overhead fraction and passing said unpolymerized portion containing isobutane to said hydrocarbon alkylation zone, wherein isobutane is alkylated by intimately contacting said isobutane with said alkylated acid solution in said hydrocarbon alkylation zone, passing the resulting reaction mixture to a separating zone wherein sulfuric acid is separated from hydrocarbons, passing said hydrocarbons separated from said sulfuric acid in said separating zone to a stabilizing zone wherein isobutane is distilled from alkymer product, condensing said isobutane and returning a portion thereof to said hydrocarbon alkylation zone, passing said alkymer product from said stabilizing zone to an alkymer product still and therein distilling from said alkymer product a desired motor fuel fraction.

OTTO N. MILLER.